US008897593B2

(12) United States Patent
Suzuki et al.

(10) Patent No.: US 8,897,593 B2
(45) Date of Patent: Nov. 25, 2014

(54) DETERMINING IMAGE QUALITY BASED ON DISTRIBUTION OF REPRESENTATIVE AUTOCORRELATION COEFFICIENTS

(75) Inventors: Tomohisa Suzuki, Yokohama (JP); Hiroyuki Mizutani, Yokohama (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 789 days.

(21) Appl. No.: 12/630,314

(22) Filed: Dec. 3, 2009

(65) Prior Publication Data

US 2010/0142819 A1 Jun. 10, 2010

(30) Foreign Application Priority Data

Dec. 4, 2008 (JP) ................................ P2008-310010

(51) Int. Cl.
*G06K 9/64* (2006.01)
*G06K 9/52* (2006.01)

(52) U.S. Cl.
CPC ...................................... *G06K 9/522* (2013.01)
USPC ........... 382/278; 382/236; 382/294; 382/289; 382/282; 382/295; 382/145; 382/151

(58) Field of Classification Search
CPC ........ G06T 7/0026; G06T 7/003; G06T 7/401
USPC .......................................................... 382/278
See application file for complete search history.

(56) References Cited

U.S. PATENT DOCUMENTS 5,506,918 A * 4/1996 Ishitani ......................... 382/289
5,801,841 A * 9/1998 Suzuki .......................... 382/234
6,836,558 B2 * 12/2004 Doi et al. ...................... 382/131
6,990,254 B2 * 1/2006 Nahum ......................... 382/278
6,996,291 B2 * 2/2006 Nahum ......................... 382/278
7,263,242 B2 * 8/2007 Kakarala et al. .............. 382/278
7,283,677 B2 * 10/2007 Gao et al. ....................... 382/250
7,551,791 B2 * 6/2009 Poon et al. .................... 382/254
7,885,480 B2 * 2/2011 Bryll et al. .................... 382/278

(Continued)

FOREIGN PATENT DOCUMENTS

JP 2006-019874 1/2006
JP 2006-157427 6/2006
JP 2006-172417 6/2006
JP 2008-123346 5/2008

OTHER PUBLICATIONS

A face recognition—Analysis, Kurita et al. IEEE, 0-8186-2915-0, 1992, pp. 213-216.*

(Continued)

*Primary Examiner* — Jayesh A Patel
(74) *Attorney, Agent, or Firm* — Finnegan, Henderson, Farabow, Garrett & Dunner, L.L.P.

(57) ABSTRACT

An image evaluation device includes: a partial area extracting section extracting plural partial areas from an original image; an extracted image generating section generating an extracted image corresponding to each of the partial areas and having pixels whose pixel values correspond to a gradient of pixel values in the image; an autocorrelation calculating section calculating plural autocorrelation coefficients for each extracted images; a representative coefficient value calculating section calculating a representative coefficient value for each of the autocorrelation coefficients among the partial areas; and a checking section checking the quality of the image based on a distribution of the representative coefficient values.

20 Claims, 13 Drawing Sheets

(56) References Cited

U.S. PATENT DOCUMENTS

| | | | | |
|---|---|---|---|---|
| 8,089,531 | B2 * | 1/2012 | Yano et al. | 348/239 |
| 2003/0026458 | A1 * | 2/2003 | Nahum | 382/106 |
| 2005/0165747 | A1 * | 7/2005 | Bargeron et al. | 707/3 |
| 2006/0159364 | A1 * | 7/2006 | Poon et al. | 382/275 |
| 2006/0204120 | A1 * | 9/2006 | Poon et al. | 382/254 |
| 2006/0210188 | A1 * | 9/2006 | Poon et al. | 382/254 |
| 2006/0262857 | A1 * | 11/2006 | Iwasaki et al. | 375/240.19 |
| 2009/0161976 | A1 * | 6/2009 | Shiraki et al. | 382/255 |

OTHER PUBLICATIONS

Office Action issued by the Japanese Patent Office on Sep. 14, 2010, for Japanese Patent Application No. 2008-310010, and English-language translation thereof.

* cited by examiner

| | | | | | | | | | | | | | | | | | |
|---|---|---|---|---|---|---|---|---|---|---|---|---|---|---|---|---|---|
| 255 | 255 | 255 | 255 | 255 | 255 | 253 | 251 | 253 | 255 | 255 | 255 | 255 | 255 | 255 | 255 | 255 | 255 |
| 255 | 255 | 255 | 255 | 255 | 252 | 238 | 224 | 238 | 252 | 255 | 255 | 255 | 255 | 255 | 255 | 255 | 255 |
| 255 | 255 | 255 | 255 | 255 | 248 | 211 | 173 | 211 | 248 | 255 | 255 | 255 | 255 | 255 | 255 | 255 | 255 |
| 255 | 255 | 253 | 249 | 246 | 237 | 189 | 141 | 189 | 237 | 246 | 246 | 246 | 248 | 252 | 255 | 255 | 255 |
| 255 | 253 | 238 | 211 | 196 | 187 | 148 | 108 | 148 | 187 | 194 | 194 | 196 | 211 | 238 | 253 | 255 | 255 |
| 255 | 251 | 224 | 173 | 146 | 137 | 108 | 79 | 108 | 135 | 138 | 140 | 146 | 174 | 224 | 251 | 255 | 255 |
| 255 | 253 | 238 | 211 | 196 | 187 | 148 | 108 | 145 | 170 | 162 | 177 | 194 | 211 | 238 | 253 | 255 | 255 |
| 255 | 255 | 253 | 249 | 246 | 237 | 187 | 134 | 175 | 187 | 159 | 196 | 234 | 246 | 253 | 255 | 255 | 255 |
| 255 | 255 | 255 | 255 | 253 | 240 | 186 | 122 | 143 | 143 | 112 | 152 | 202 | 232 | 247 | 253 | 255 | 255 |
| 255 | 255 | 255 | 251 | 234 | 202 | 148 | 93 | 105 | 103 | 79 | 110 | 151 | 180 | 205 | 236 | 253 | 255 |
| 255 | 255 | 253 | 234 | 193 | 152 | 112 | 93 | 139 | 141 | 107 | 146 | 171 | 146 | 146 | 205 | 247 | 255 |
| 255 | 255 | 247 | 207 | 158 | 162 | 146 | 121 | 174 | 176 | 138 | 187 | 219 | 181 | 146 | 180 | 232 | 253 |
| 255 | 253 | 232 | 182 | 158 | 196 | 182 | 136 | 170 | 171 | 156 | 208 | 243 | 228 | 178 | 156 | 209 | 249 |
| 255 | 249 | 209 | 157 | 180 | 223 | 193 | 137 | 148 | 150 | 181 | 232 | 252 | 244 | 192 | 144 | 196 | 246 |
| 255 | 246 | 196 | 144 | 192 | 237 | 205 | 146 | 135 | 151 | 206 | 247 | 254 | 246 | 194 | 142 | 194 | 246 |
| 255 | 246 | 194 | 142 | 194 | 239 | 213 | 150 | 127 | 174 | 230 | 252 | 255 | 244 | 193 | 144 | 196 | 246 |
| 255 | 246 | 196 | 143 | 188 | 221 | 189 | 141 | 129 | 178 | 230 | 246 | 244 | 228 | 181 | 158 | 209 | 249 |
| 255 | 249 | 209 | 156 | 165 | 177 | 170 | 177 | 178 | 183 | 209 | 207 | 195 | 181 | 171 | 194 | 234 | 253 |
| 255 | 253 | 234 | 192 | 159 | 160 | 194 | 228 | 232 | 221 | 209 | 171 | 149 | 159 | 194 | 232 | 251 | 255 |
| 255 | 255 | 251 | 234 | 211 | 211 | 235 | 251 | 253 | 249 | 236 | 211 | 199 | 209 | 234 | 251 | 255 | 255 |
| 255 | 255 | 255 | 253 | 249 | 249 | 253 | 255 | 255 | 255 | 253 | 249 | 247 | 249 | 252 | 255 | 255 | 255 |

| | | | | | | | | | | | | | | | | | |
|---|---|---|---|---|---|---|---|---|---|---|---|---|---|---|---|---|---|
| 0 | 0 | 0 | 0 | 0 | -2 | -4 | 0 | 4 | 2 | 0 | 0 | 0 | 0 | 0 | 0 | 0 | 0 |
| 0 | 0 | 0 | 0 | -3 | -17 | -28 | 0 | 28 | 17 | 3 | 0 | 0 | 0 | 0 | 0 | 0 | 0 |
| 0 | 0 | 0 | 0 | -7 | -44 | -75 | 0 | 75 | 44 | 7 | 0 | 0 | 0 | 0 | 0 | 0 | 0 |
| 0 | -2 | -8 | -7 | -12 | -57 | -96 | 0 | 98 | 57 | 9 | 0 | 2 | 8 | 7 | 3 | 0 | 0 |
| -2 | -17 | -42 | -42 | -24 | -48 | -79 | 0 | 79 | 46 | 7 | 2 | 17 | 42 | 42 | 17 | 2 | 0 |
| -4 | -31 | -78 | -78 | -38 | -38 | -58 | 0 | 58 | 30 | 5 | 8 | 34 | 78 | 77 | 31 | 4 | 0 |
| -2 | -17 | -42 | -42 | -24 | -48 | -79 | -3 | 82 | 17 | 7 | 32 | 34 | 44 | 42 | 17 | 2 | 0 |
| 0 | -2 | -8 | -7 | -12 | -59 | -103 | -12 | 53 | -16 | 9 | 75 | 50 | 19 | 9 | 2 | 0 | 0 |
| 0 | 0 | 0 | -2 | -15 | -67 | -116 | -43 | 21 | -31 | 9 | 90 | 80 | 45 | 21 | 8 | 2 | 0 |
| 0 | 0 | -4 | -21 | -49 | -66 | -109 | -43 | 10 | -28 | 7 | 72 | 70 | 54 | 58 | 48 | 19 | 2 |
| 0 | -2 | -21 | -60 | -82 | -81 | -59 | 27 | 48 | -32 | 5 | 64 | 0 | -25 | 59 | 101 | 50 | 6 |
| 0 | -8 | -48 | -89 | -45 | -12 | -41 | 28 | 55 | -36 | 11 | 81 | -8 | -73 | -1 | 86 | 73 | 21 |
| -2 | -23 | -71 | -74 | 14 | 24 | -80 | -12 | 35 | -14 | 37 | 87 | 20 | -65 | -72 | 31 | 93 | 40 |
| -8 | -48 | -92 | -29 | 66 | 13 | -86 | -45 | 13 | 33 | 82 | 71 | 12 | -60 | -100 | 4 | 102 | 50 |
| -9 | -59 | -102 | -4 | 93 | 13 | -91 | -70 | 5 | 71 | 96 | 46 | -1 | -60 | -104 | 0 | 104 | 52 |
| -9 | -81 | -104 | 0 | 97 | 19 | -89 | -66 | 24 | 103 | 76 | 25 | -8 | -82 | -100 | 3 | 102 | 50 |
| -9 | -59 | -103 | -8 | 78 | 1 | -80 | -80 | 37 | 101 | 68 | 14 | -18 | -83 | -70 | 28 | 91 | 40 |
| -6 | -46 | -93 | -44 | 21 | 5 | 0 | 8 | 8 | 31 | 24 | -14 | -28 | -24 | 13 | 63 | 59 | 19 |
| -2 | -21 | -81 | -75 | -32 | 35 | 66 | 38 | -7 | -23 | -50 | -60 | -12 | 45 | 73 | 57 | 23 | 4 |
| 0 | -4 | -21 | -40 | -23 | 24 | 40 | 18 | -2 | -17 | -38 | -37 | -2 | 35 | 42 | 21 | 4 | 0 |
| 0 | 0 | -2 | -8 | -4 | 4 | 6 | 2 | 0 | -2 | -8 | -6 | 0 | 5 | 8 | 3 | 0 | 0 |

| | | | | | | | | | | | | | | | | | |
|---|---|---|---|---|---|---|---|---|---|---|---|---|---|---|---|---|---|
| 0 | 0 | 0 | 0 | 0 | -3 | -15 | -27 | -15 | -3 | 0 | 0 | 0 | 0 | 0 | 0 | 0 | 0 |
| 0 | 0 | 0 | 0 | 0 | -7 | -42 | -78 | -42 | -7 | 0 | 0 | 0 | 0 | 0 | 0 | 0 | 0 |
| 0 | 0 | -2 | -6 | -9 | -15 | -49 | -63 | -49 | -15 | -9 | -9 | -9 | -7 | -3 | 0 | 0 | 0 |
| 0 | -2 | -17 | -44 | -59 | -61 | -63 | -65 | -63 | -61 | -61 | -61 | -59 | -44 | -17 | -2 | 0 | 0 |
| 0 | -4 | -29 | -76 | -100 | -100 | -81 | -62 | -61 | -102 | -106 | -106 | -100 | -74 | -28 | -4 | 0 | 0 |
| 0 | 0 | 0 | 0 | 0 | 0 | 0 | 0 | -3 | -17 | -32 | -17 | -2 | 0 | 0 | 0 | 0 | 0 |
| 0 | 4 | 29 | 76 | 100 | 100 | 79 | 55 | 67 | 52 | 21 | 56 | 86 | 72 | 29 | 4 | 0 | 0 |
| 0 | 2 | 17 | 44 | 57 | 53 | 36 | 14 | -2 | -27 | -50 | -25 | 8 | 21 | 9 | 0 | 0 | 0 |
| 0 | 0 | 2 | 2 | -12 | -35 | -39 | -41 | -70 | -84 | -80 | -88 | -83 | -66 | -46 | -19 | -2 | 0 |
| 0 | 0 | -2 | -21 | -60 | -66 | -74 | -29 | -4 | -2 | -5 | -6 | -31 | -66 | -101 | -48 | -8 | 0 |
| 0 | 0 | -8 | -44 | -76 | -40 | -2 | 26 | 69 | 73 | 59 | 77 | 66 | 1 | -59 | -56 | -21 | -2 |
| 0 | -2 | -21 | -52 | -35 | 44 | 70 | 43 | 31 | 30 | 49 | 62 | 72 | 62 | 32 | -49 | -38 | -6 |
| 0 | -6 | -38 | -50 | 22 | 61 | 47 | 16 | -28 | -28 | 43 | 45 | 33 | 63 | 46 | -36 | -36 | -7 |
| 0 | -7 | -36 | -36 | 34 | 41 | 23 | 10 | -35 | -20 | 50 | 39 | 11 | 16 | 16 | -14 | -15 | -3 |
| 0 | -3 | -15 | -15 | 14 | 16 | 20 | 13 | -21 | 24 | 49 | 20 | 3 | 0 | 1 | 0 | 0 | 0 |
| 0 | 0 | 0 | -1 | -4 | -16 | -16 | -5 | -6 | 27 | 24 | -1 | -10 | -16 | -13 | 16 | 15 | 3 |
| 0 | 3 | 15 | 14 | -29 | -62 | -43 | 27 | 51 | 9 | -21 | -45 | -80 | -83 | -22 | 50 | 38 | 7 |
| 0 | 7 | 36 | 49 | -29 | -61 | 5 | 87 | 103 | 43 | -21 | -75 | -95 | -69 | 13 | 74 | 42 | 6 |
| 0 | 6 | 42 | 76 | 46 | 34 | 85 | 74 | 75 | 66 | 27 | 4 | 4 | 26 | 63 | 57 | 21 | 2 |
| 0 | 2 | 21 | 61 | 90 | 89 | 59 | 27 | 23 | 34 | 44 | 78 | 96 | 90 | 58 | 23 | 4 | 0 |
| 0 | 0 | 4 | 19 | 36 | 38 | 16 | 4 | 2 | 6 | 17 | 36 | 46 | 40 | 18 | 4 | 0 | 0 |

FIG. 12A

| | | | | | | | |
|---|---|---|---|---|---|---|---|
| 255 | 244 | 194 | 146 | 195 | 245 | 255 | 255 |
| 255 | 249 | 209 | 157 | 180 | 232 | 252 | 251 |
| 255 | 253 | 232 | 180 | 156 | 209 | 246 | 236 |
| 255 | 255 | 244 | 192 | 144 | 196 | 242 | 225 |
| 255 | 255 | 246 | 197 | 146 | 197 | 244 | 240 |
| 255 | 255 | 249 | 211 | 173 | 211 | 248 | 253 |
| 255 | 255 | 253 | 238 | 224 | 238 | 253 | 255 |
| 255 | 255 | 255 | 253 | 251 | 253 | 255 | 255 |

FIG. 12B

| | | | | | | | |
|---|---|---|---|---|---|---|---|
| -7 | -61 | -98 | 1 | 99 | 60 | 10 | -4 |
| 19 | -46 | -92 | -29 | 75 | 72 | 19 | -20 |
| 61 | -23 | -73 | -76 | 29 | 90 | 27 | -47 |
| 82 | -11 | -63 | -100 | 4 | 98 | 29 | -52 |
| 57 | -9 | -58 | -100 | 0 | 98 | 43 | -18 |
| 18 | -6 | -44 | -76 | 0 | 75 | 42 | 3 |
| 2 | -2 | -17 | -29 | 0 | 29 | 17 | 2 |
| 0 | 0 | -2 | -4 | 0 | 4 | 2 | 0 |

FIG. 12C

| | | | | | | | |
|---|---|---|---|---|---|---|---|
| 2 | 17 | 29 | 0 | -29 | -17 | -3 | -4 |
| 0 | 9 | 38 | 34 | -39 | -36 | -9 | -19 |
| 0 | 6 | 35 | 35 | -36 | -36 | -10 | -26 |
| 0 | 2 | 14 | 17 | -10 | -12 | -2 | 4 |
| 0 | 0 | 5 | 19 | 29 | 15 | 6 | 28 |
| 0 | 0 | 7 | 41 | 78 | 41 | 9 | 15 |
| 0 | 0 | 6 | 42 | 78 | 42 | 7 | 2 |
| 0 | 0 | 2 | 17 | 31 | 17 | 2 | 0 |

FIG. 15A

| | | | | | | | |
|---|---|---|---|---|---|---|---|
| 0 | 0 | 0 | 40 | 56 | 40 | 0 | 0 |
| 0 | 0 | 0 | 66 | 71 | 24 | 0 | 0 |
| 0 | 0 | 0 | 97 | 123 | 34 | 0 | 0 |
| 0 | 0 | 0 | 120 | 203 | 78 | 0 | 0 |
| 0 | 0 | 0 | 121 | 255 | 121 | 0 | 0 |
| 0 | 0 | 0 | 78 | 203 | 120 | 0 | 0 |
| 0 | 0 | 0 | 34 | 123 | 97 | 0 | 0 |
| 0 | 0 | 0 | 24 | 71 | 66 | 0 | 0 |

FIG. 15B

| | | | | | | | |
|---|---|---|---|---|---|---|---|
| 40 | 34 | 17 | 65 | 151 | 65 | 17 | 34 |
| 9 | 1 | 0 | 0 | 66 | 0 | 0 | 0 |
| 0 | 0 | 0 | 0 | 0 | 0 | 0 | 0 |
| 0 | 0 | 0 | 30 | 129 | 31 | 0 | 0 |
| 31 | 32 | 43 | 138 | 255 | 138 | 43 | 32 |
| 0 | 0 | 0 | 31 | 129 | 30 | 0 | 0 |
| 0 | 0 | 0 | 0 | 0 | 0 | 0 | 0 |
| 9 | 0 | 0 | 0 | 66 | 0 | 0 | 1 |

FIG. 15C

| | | | | | | | |
|---|---|---|---|---|---|---|---|
| 52 | 30 | 0 | 0 | 0 | 0 | 0 | 30 |
| 35 | 0 | 0 | 0 | 0 | 0 | 13 | 38 |
| 0 | 0 | 0 | 0 | 45 | 56 | 32 | 16 |
| 0 | 0 | 0 | 63 | 173 | 126 | 18 | 0 |
| 0 | 0 | 0 | 142 | 255 | 142 | 0 | 0 |
| 0 | 0 | 18 | 126 | 173 | 63 | 0 | 0 |
| 0 | 16 | 32 | 56 | 45 | 0 | 0 | 0 |
| 35 | 38 | 13 | 0 | 0 | 0 | 0 | 0 |

FIG. 15D

| | | | | | | | |
|---|---|---|---|---|---|---|---|
| 23 | 38 | 66 | 89 | 106 | 89 | 66 | 38 |
| 0 | 0 | 0 | 4 | 32 | 64 | 74 | 41 |
| 0 | 0 | 0 | 0 | 0 | 0 | 0 | 0 |
| 0 | 1 | 18 | 35 | 58 | 37 | 0 | 0 |
| 13 | 25 | 81 | 182 | 255 | 182 | 81 | 25 |
| 0 | 0 | 0 | 37 | 58 | 35 | 18 | 1 |
| 0 | 0 | 0 | 0 | 0 | 0 | 0 | 0 |
| 0 | 41 | 74 | 64 | 32 | 4 | 0 | 0 |

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 30 | 58 | 31 | 0 | 0 |
| 0 | 0 | 0 | 121 | 255 | 121 | 0 | 0 |
| 0 | 0 | 0 | 31 | 58 | 30 | 0 | 0 |
| 0 | 0 | 0 | 0 | 0 | 0 | 0 | 0 |
| 0 | 0 | 0 | 0 | 0 | 0 | 0 | 0 |

DETERMINING IMAGE QUALITY BASED ON DISTRIBUTION OF REPRESENTATIVE AUTOCORRELATION COEFFICIENTS

CROSS-REFERENCE TO RELATED APPLICATION

This application is based upon and claims the benefit of priority from the prior Japanese Patent Application No. 2008-310010, filed on Dec. 4, 2008; the entire contents of which are incorporated herein by reference.

BACKGROUND OF THE INVENTION

1. Field of the Invention

The present invention relates to an image evaluation device and an image evaluation method for evaluating the quality of image.

2. Description of the Related Art

Various techniques have been developed to evaluate the quality of image (for instance, the presence/absence of blurring, camera-shake and the like occurred in an image captured by an imaging system such as a camera). Here, a technique for evaluating the quality of image based on an edge of the image has been disclosed (refer to Reference 1 to 3 (which are, JP-A 2006-019874 (KOKAI), JP-A 2006-172417 (KOKAI), and JP-A 2008-123346 (KOKAI), in order)). Reference 1 discloses a technique in which a histogram of an estimated value of edge width is computed for each direction, and if the histogram different among the directions, it is determined that the camera-shake has affected the image. Reference 2 discloses a technique in which an average of edge widths of an original image is estimated to evaluate the degree of blurring. Furthermore, Reference 2 discloses a technique in which direction of the camera-shake is estimated as the direction perpendicular to the direction in which an edge strength is maximum, an autocorrelation is calculated along the camera-shake direction, and a displacement of the minimum value of the autocorrelation is computed as a width of the camera-shake. Reference 3 discloses a technique in which an average of edge widths is computed for each direction, and if all the averages are equal to or less than a threshold value, it is determined that no blurring occurs. Furthermore, Reference 3 discloses a technique in which edge patterns are classified based on a pattern matching of coefficients of DCT, an edge width is estimated based on a representative value of edge widths previously computed for each classification, and a blur region is narrowed down by setting it as a part in which the estimated edge width is wide.

BRIEF SUMMARY OF THE INVENTION

In the techniques disclosed in References 1 to 3, the edge direction is estimated and the edge width along the edge direction is calculated. A method based on the calculation of the edge width is effective for evaluating a simple blurring. However, when the camera-shake has affected the image, the estimation of the edge direction may be incorrect. For this reason, it may be difficult to accurately evaluate the image quality with these methods. Furthermore, with these methods, when ghost images are present and no other defects are significant, a sharpness of edge is unaffected. Accordingly, the defect of the image quality may be undetected.

One of the object of the present invention is to provide an image evaluation device and an image evaluation method which does not depend on estimation gradient direction.

An image evaluation device according to one aspect of the present invention includes: a partial area extracting section extracting a plurality of partial areas from an image; an extracted image generating section extracting a plurality of extracted images corresponding to the plurality of partial areas from the image; an autocorrelation calculating section calculating a plurality of autocorrelation coefficients corresponding to the plurality of extracted images; a representative coefficient value calculating section calculating a representative coefficient value of the plurality of autocorrelation coefficients; and a checking section checking the quality of the image based on a distribution of the representative coefficient values.

An image evaluation method according to one aspect of the present invention includes: extracting a plurality of partial areas from an image; generating a plurality of extracted images corresponding to the plurality of partial areas of which pixel values are gradient of pixel values in the image; calculating a plurality of autocorrelation coefficients corresponding to the plurality of extracted images; calculating a representative coefficient value of the plurality of autocorrelation coefficients; and determining the quality of the image based on a distribution of the representative coefficient values.

In a later-described embodiment of the present invention, a degradation function representing an image degradation in the imaging system is calculated from the original image, and as the degradation function, an autocorrelation of impulse response of the imaging system is used, for instance. The autocorrelation of impulse response is estimated as the degradation function for the following reason.

Many of the image degradations in the imaging system can be modeled by a two-dimensional linear system of which ideal images captured by an imaging system without image degradation are the input and images captured by the imaging system with image degradation are the output. The impulse response of the linear system is spread because of the image degradation such as blurring, camera-shake, ghost images, and afterimage. For instance, if the captured image is blurred, the impulse response is spread isotropically like a Gaussian, and when the camera-shake has affected the image, the response is spread along a line. Furthermore, when the ghost images or afterimages are present, extra peaks other than the one at the origin are observed in the impulse response. Since the extent of impulse response causes the extent of autocorrelation of the impulse response, the image degradation causes extent of the autocorrelation of the impulse response. Therefore, by estimating the autocorrelation of the impulse response as the degradation function and evaluating the degree of the extent, it is possible to check the presence/absence of the image degradation.

In the explanation hereinbelow, it is assumed that a linear operator is used for extracting edge images, and an edge image of an ideal image with no image degradation is called "ideal edge image", and an edge image extracted from the original image with image degradation is simply called "edge image".

In the present invention, the degradation function is estimated based on the edge image instead of the original image. Under the assumption where the linear operator is used for extracting the edge image, a linear system for converting the ideal edge image into the edge image is equal to a linear system in which the image degradation is modeled, therefore it is possible to estimate the degradation function using the edge image instead of the original image as described above.

The extent of the autocorrelation coefficients of the edge images in the partial areas can be regarded as sum of the extent due to the image degradation and the extent due to a geometrical structure of the ideal edge images in the respective partial areas. Furthermore, the extent in accordance with the geometrical structure reflects a tendency of a positional relationship between each pixel on which the pixel value is non-zero in the ideal edge image. For instance, at a portion where the edge is linear in the horizontal direction, the autocorrelation coefficients of the edge image are spread horizontally and at a portion where the edge is linear in the vertical direction, the coefficients are spread vertically.

The tendency of the geometrical structure differs among the partial areas, in which when the autocorrelation coefficient of the ideal edge image in each of the partial areas is calculated, the extent in accordance with the structure of each of the partial areas is observed, and the origin is the only point on which the autocorrelation coefficient is always positive regardless of the structure of each of the partial areas. Accordingly, the autocorrelation of the ideal edge image calculated for each of the partial areas can be decomposed into a part of the origin where the correlation always becomes positive, and a sum of parts that depend on the geometrical structure.

Therefore, the autocorrelation of each of the partial areas of the edge image formed by degrading the ideal edge image with the linear system can also be decomposed into a component corresponding to the image degradation and a sum of components corresponding to the geometrical structure. Accordingly, if the components that depend on the geometrical structure are assumed to be positive, the components corresponding to the structure is eliminated by calculating the minimum value of the autocorrelation calculated for each of coordinates among the partial areas of the edge image, so that the component corresponding to the image degradation is computed. Therefore, in the present invention, the autocorrelation of impulse response, namely, the degradation function is estimated by calculating the representative coefficient value such as the minimum value for each of the coordinates of the autocorrelation, as described above.

The pixel value of each pixel in the edge image is a complex number expressing the gradient vector of the original image By this design, the extraction of the edge image is performed through the linear conversion of the original image, which is convenient since it matches with the aforementioned assumption.

BRIEF DESCRIPTION OF THE DRAWINGS

FIG. 12A is a diagram showing an example of two-dimensional vectors representing an original image of a partial area.

FIG. 12B is a diagram showing an example of two-dimensional vectors representing real components of an edge image.

FIG. 12C is a diagram showing an example of two-dimensional vectors representing imaginary components of the edge image.

FIG. 15A is a diagram showing an example of two-dimensional array representing the autocorrelation coefficients.

FIG. 15B is a diagram showing an example of two-dimensional array representing the autocorrelation coefficients.

FIG. 15C is a diagram showing an example of two-dimensional array representing the autocorrelation coefficients.

FIG. 15D is a diagram showing an example of two-dimensional array representing the autocorrelation coefficients.

DETAILED DESCRIPTION OF THE INVENTION

Hereinafter, embodiments of the present invention will be described in detail with reference to the drawings.

Figure 1:
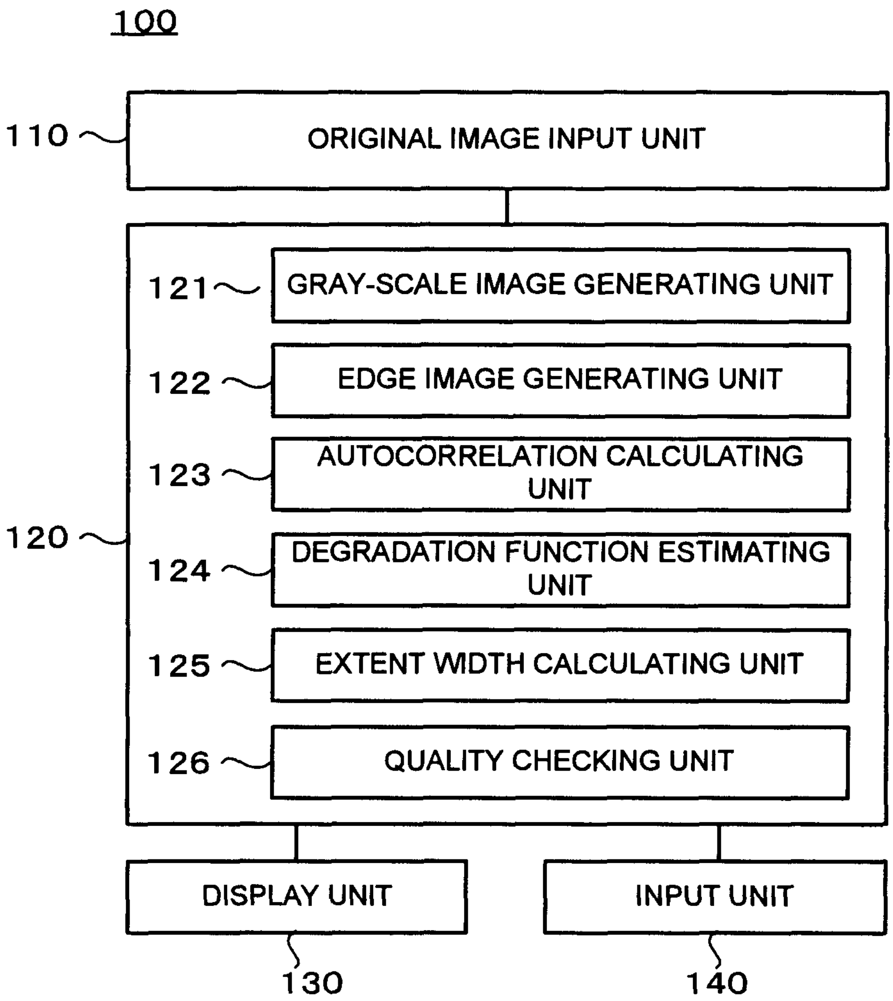
FIG. 1 is a block diagram showing an image evaluation device 100 according to an embodiment of the present invention.

FIG. 1 is a block diagram showing an image evaluation device 100 according to an embodiment of the present invention. The image evaluation device 100 includes an original image input unit 110, an image evaluation unit 120, a display unit 130, and an input unit 140.

The image evaluation device 100 can be structured by incorporating image evaluation software into a computer, so that the explanation will be made hereinafter by assuming that such a structure is made. However, it is also possible to structure the image evaluation device 100 using dedicated hardware, an aggregate of dedicated hardware, or a computer network for distributed processing. The image evaluation device 100 can adopt, not only the structure cited here, but also various structures.

The original image input unit 110 is an input device to input data of an original image. The image evaluation unit 120 is for evaluating the quality of the original image (for instance, the presence/absence of blurring, camera-shake and the like occurred in an image captured by an imaging system such as a camera), and includes a gray-scale image generating unit 121, an edge image generating unit 122, an autocorrelation calculating unit 123, a degradation function estimating unit 124, a extent width calculating unit 125, and a quality checking unit 126. Note that the image evaluation unit 120 can be structured by a combination of a CPU (Central Processing Unit) and software. The display unit 130 is a display device that displays an image and the like such as, for instance, a CRT and an LCD. The input unit 140 is an input device to input information such as, for instance, a keyboard and a mouse.

It is set such that the original image in the present embodiment is a color image or a gray-scale image whose number of pixels in the horizontal direction and the vertical direction are respectively w and h. The color image can be represented as a combination of two-dimensional arrays R (x, y), G (x, y), and B (x, y) of luminance values of a red component, a green component, and a blue component. The gray-scale image can be represented as a two-dimensional array I (x, y) of a luminance value.

Here, x and y indicate coordinates in the horizontal direction and in the vertical direction, respectively. In the coordinates x, y, the right direction and the downward direction are respectively set as positive directions. Note that the coordinates x, y are represented by using a pixel as a unit.

Figures 2, 3:
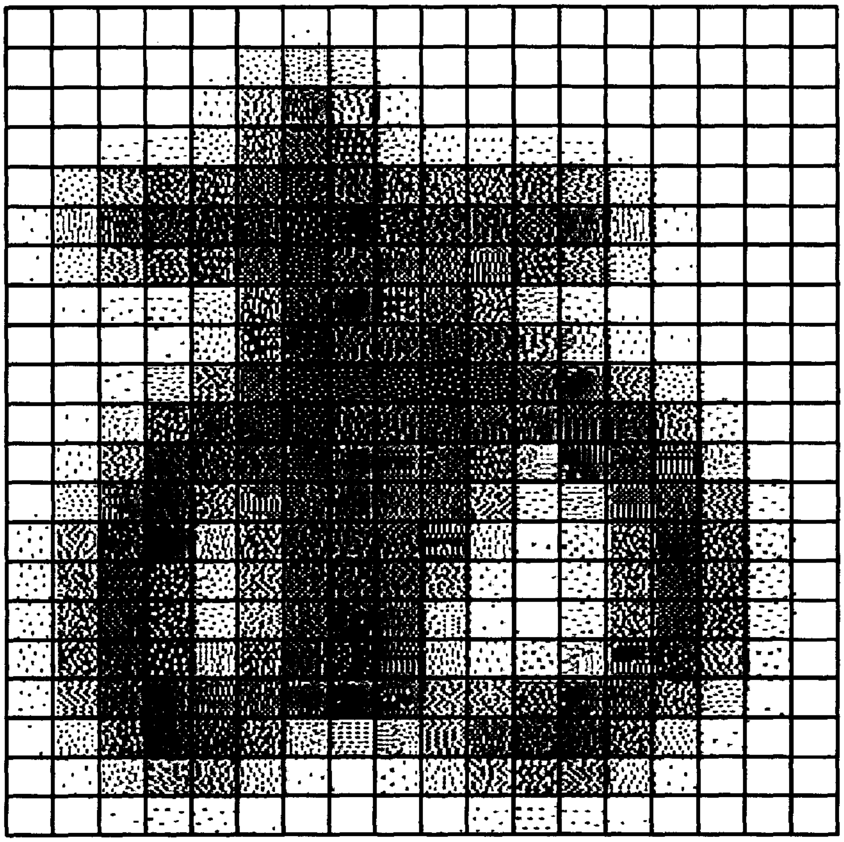
FIG. 2 is a diagram showing an example of a gray-scale image.
FIG. 3 is a diagram showing a two-dimensional array corresponding to the gray-scale image.

In the present embodiment, the luminance values R (x, y), G (x, y), B (x, y), and I (x, y) are set to be represented by an integer from 0 to 255. For instance, a gray-scale image shown in FIG. 2 is represented as a two-dimensional array shown in FIG. 3.

The gray-scale image generating unit 121 gray-scales the original image (color image) when the original image is the color image. As a result of this, the two-dimensional array I (x, y) of the luminance value is generated, similar to the case where the original image is gray-scale. For example, the gray-scale is performed in accordance with the following expression (1).

$$I(x,y)=\max(0,\min(I_{max}, W_R R(x,y)+W_G G(x,y)+W_B B(x,y))) \qquad \text{expression (1)}$$

Note that $W_R$, $W_G$, and $W_B$ are positive constants for weighting the red component, the green component, and the blue component, and min $(x_1, \ldots x_n)$ and max $(x_1, \ldots x_n)$ indicate the minimum value of $x_1, \ldots x_n$, and the maximum value of $x_1, \ldots x_n$, respectively. $I_{max}$ is the upper limit value of the luminance.

The expression (1) indicates, as in the following expression (2), that the two-dimensional array I (x, y) is represented by the weighting sum of the two-dimensional arrays R (x, y), G (x, y) and B (x, y). Both min and max are for ensuring that the calculated value of the two-dimensional array I (x, y) is between the upper limit ($I_{max}$) and the lower limit (0).

$$I(x,y)=W_R\cdot R(x,y)+W_G\cdot G(x,y)+W_B\cdot B(x,y) \qquad \text{expression (2)}$$

The edge image generating unit 122 generates an edge image from the gray-scale image. A combination of the edge image generating unit 122 and a later-described extracted image extracting unit 156 works as an extracted image generating section that generates a plurality of extracted images corresponding to a plurality of partial areas. The gray-scale image can be either the original image itself, or the gray-scale image generated from the original image (color image).

The edge image is, for instance, an image having pixels whose pixel values correspond to a gradient of pixel values of the original image (gray-scale image). The pixel values of the edge image here indicate the gradient of pixel values of the gray-scale image. Here, the pixel value of the edge image (value of gradient) is set to a complex number. Namely, the edge image generating unit 122 calculates a gradient vector of each pixel of the gray-scale image, and generates the edge image in which a horizontal component and a vertical component of the vector are respectively set to a real component and an imaginary component of the pixel.

A gradient vector g (x, y) in coordinates (x, y) can be defined by the following expression (3).

$$g(x,y)=(I(x+1,y)-I(x-1,y),I(x,y+1)-I(x,y-1)) \qquad \text{expression (3)}$$

Therefore, a pixel value E (x, y) of the edge image in the coordinates (x, y) can be calculated in accordance with the following expression (4).

$$E(x,y)=(I(x+1,y)-I(x-1,y)+j\cdot(I(x,y+1)-I(x,y-1)) \qquad \text{expression (4)}$$

Note that "j" is set to indicate an imaginary unit.

Here, in the calculation of pixel value E (x, y), when the coordinates (x+1, y) position on the right side of a right edge of the image, namely, when x+1>w, it is set that I (x+1, y)=I (w−1, y). In like manner, when x−1<0, it is set that I (x−1, y)=I (0, y). Furthermore, when y+1>h, it is set that I (x, y+1)=I (x, h−1). When y−1<0, it is set that I (x, y−1)=I (x, 0).

Since a pixel value is not defined on the outside of the gray-scale image, the gradient at the edge of the image cannot be calculated. By setting the pixel value on the outside of the image to have the same value as the pixel value in the periphery of the image, it becomes possible to calculate the gradient at the edge of the image.

Figures 4, 5:
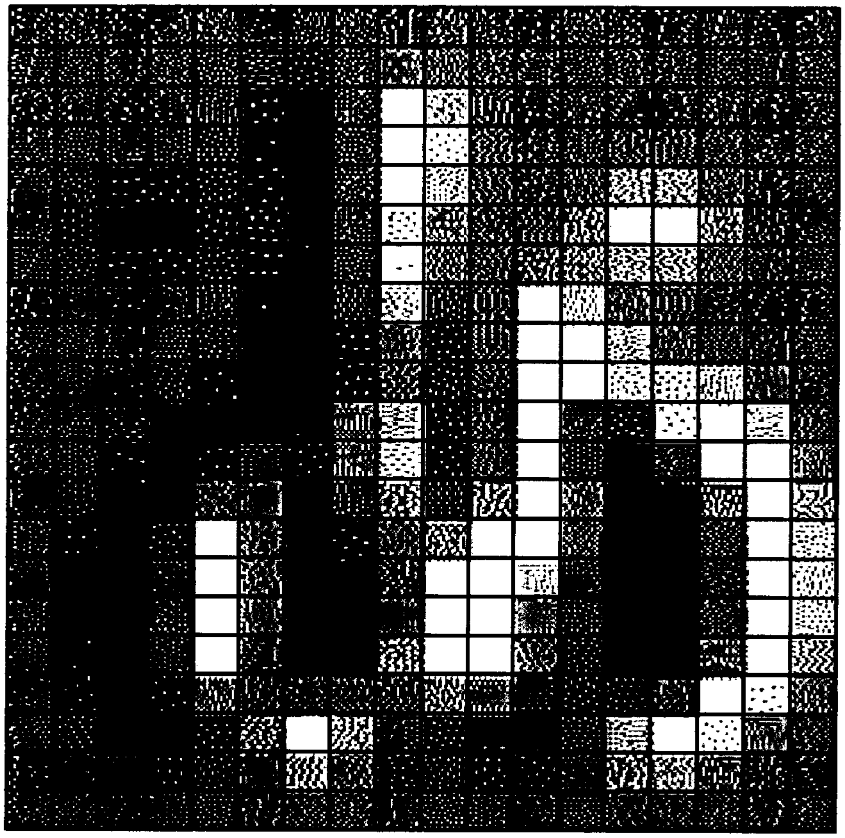
FIG. 4 is a diagram showing an example of real components of an edge image.
FIG. 5 is a diagram showing an example of the real components of the edge image.
Figures 6, 7:
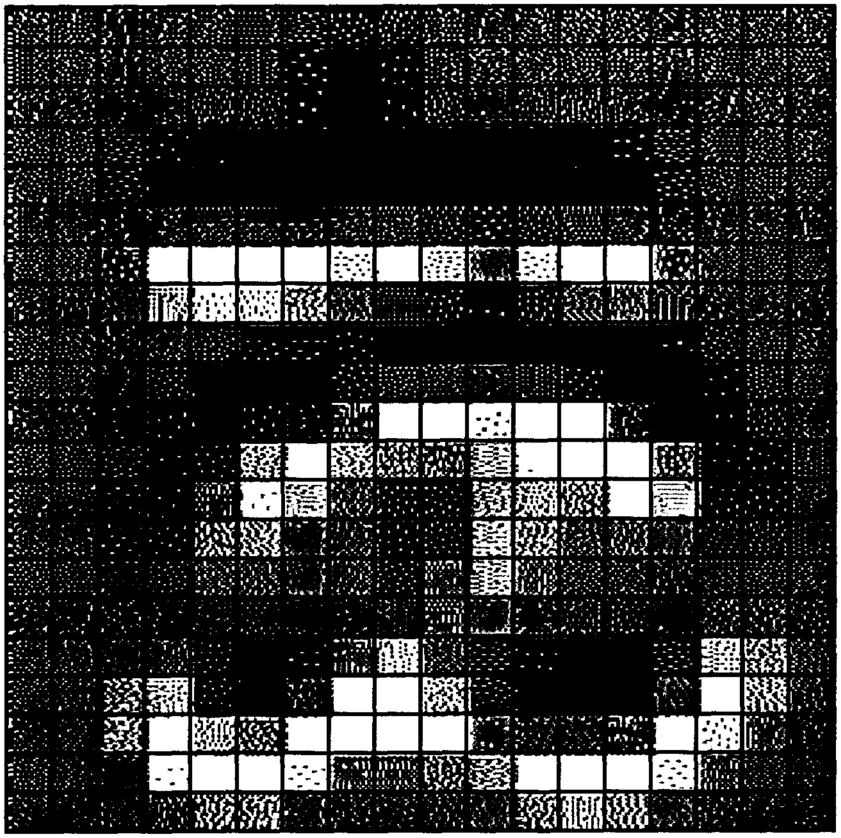
FIG. 6 is a diagram showing an example of imaginary components of the edge image.
FIG. 7 is a diagram showing an example of the imaginary components of the edge image.

Real components and imaginary components as a result of calculating the edge image in the edge image generating unit 122 from the image shown in FIG. 2 and FIG. 3 are shown in FIG. 4 and FIG. 5, and in FIG. 6 and FIG. 7, respectively. In FIG. 4 and FIG. 6, magnitudes of the respective components are shown by gradation. A pixel whose respective components are close to zero is indicated by a gray color, a pixel in which the magnitudes of the respective components are large is indicated by a brighter color, and a pixel in which the magnitudes of the respective components are small is indicated by a darker color.

The expression (4) represents an expanded gradient coefficient (edge image) in which gradients in two directions (horizontal direction and vertical direction) are set to the real component and the imaginary component.

As above, the amount corresponding to a clarity of the edge (particularly, the amount having an absolute value whose magnitude corresponds to the clarity of the edge) can be used instead of the pixel value represented by the expression (4). For instance, as in the following expressions (4a), (4b), and (4c), it is possible to define the edge image using an image in which a gradient in one direction (horizontal direction, vertical direction, or diagonal direction) itself is set as a pixel value.

$$E(x,y)=I(x+1,y)-I(x-1,y) \qquad \text{expression (4a)}$$

$$E(x,y)=I(x,y+1)-I(x,y-1) \qquad \text{expression (4b)}$$

$$E(x,y)=I(x+1,y+1)-I(x-1,y-1) \qquad \text{expression (4c)}$$

The edge image represented by the expression (4) is defined by a linear amount corresponding to a difference in luminance of pixels adjacent to a pixel of coordinates (x, y). On the contrary, it is also possible to define the edge image using a non-linear amount (for instance, an amount computed by non-linear converting a difference in luminance). For example, it is possible to create a non-linear edge image by setting a norm of the gradient vector g (x, y) to E (x, y), and the like.

As described above, the amount having an absolute value whose magnitude corresponds to the clarity of the edge (in other words, the amount having a large absolute value which intensively appears on the periphery of the edge of the original image) can be used for the definition of the edge image.

Figure 8:
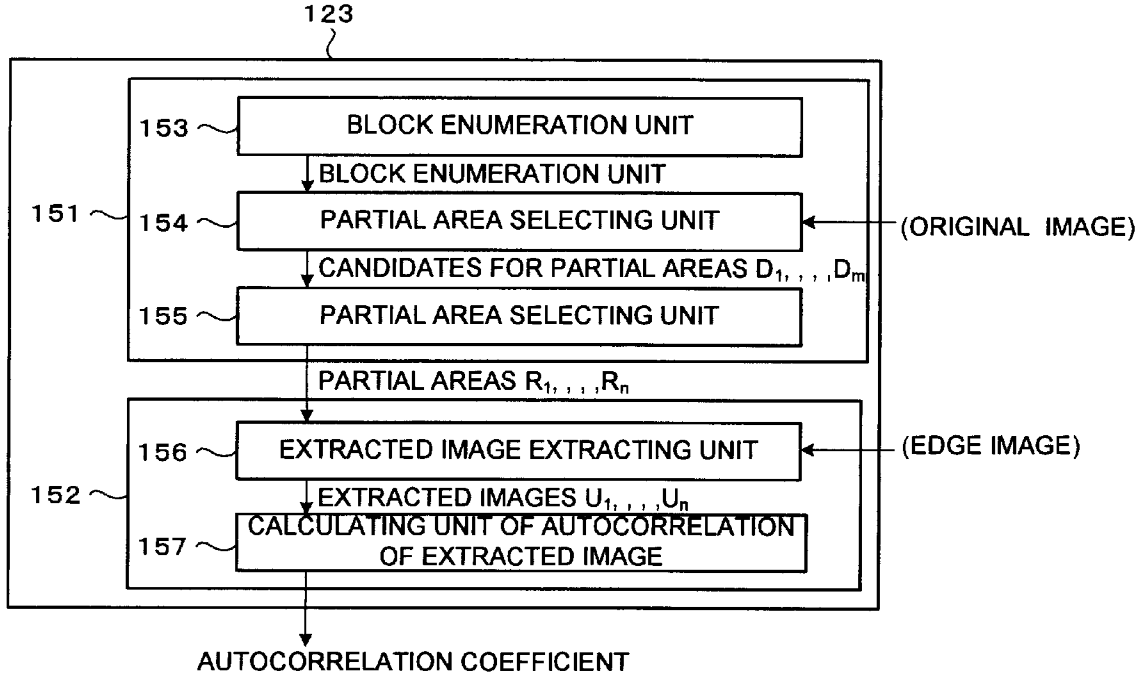
FIG. 8 is a block diagram showing an example of a structure of the autocorrelation calculating unit 123.

The autocorrelation calculating unit 123 calculates a second-order or higher of an autocorrelation coefficient of the edge image in each of n partial areas $R_1, \ldots R_n$. FIG. 8 is a block diagram showing an example of a structure of the autocorrelation calculating unit 123. The autocorrelation calculating unit 123 includes a partial area enumeration unit 151, and a calculating unit of autocorrelation in area 152.

Figure 9:
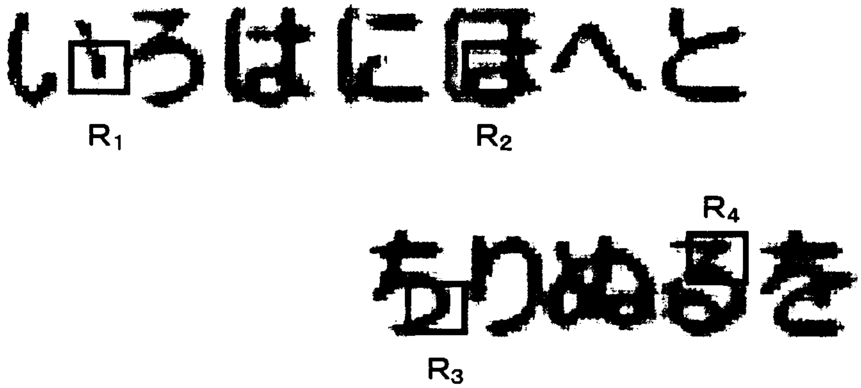
FIG. 9 is a diagram showing an example of partial areas enumerated by a partial area enumeration unit 151.

The partial area enumeration unit 151 enumerates (extracts), from the original image, n partial areas $R_1, \ldots R_n$ including a certain number or more of pixels whose pixel values are largely different from a representative pixel value. The partial area enumeration unit 151 works as a partial area extracting section that extracts a plurality of partial areas from the original image. FIG. 9 shows an example of partial areas $R_1, \ldots R_4$ enumerated by the partial area enumeration unit 151. The calculating unit of autocorrelation in area 152 calculates, for each of partial areas $R_k$, an autocorrelation coefficient $C_k$ (p, q) of the pixel value E (x, y) of the edge image.

Note that each of the partial areas $R_k$ is a quadrangle having a width of a and a height of b, and coordinates at the upper-left corner of the kth quadrangle $R_k$ are set to $(x_k, y_k)$. Furthermore, p and q indicate coordinates in the horizontal direction and in the vertical direction, respectively, and take integers within the following range in which a pixel is used as a unit.

$$p_{min} \le p \le p_{max}$$

$$q_{min} \le q \le q_{max}$$

$$p_{min} = -\text{Floor}(a/2), p_{max} = p_{min} + a - 1$$

$$q_{min} = -\text{Floor}(b/2), q_{max} = q_{min} + b - 1$$

Note that Floor (x) is set to indicate the maximum value of integers equal to or less than x.

The minimum value $p_{min}$ and the maximum value $p_{max}$ are set so that a substantially center of each of the partial areas $R_k$ corresponds to the origin (0, 0). When the width a and the height b are odd numbers, the center of the partial area $R_k$ coincides with the origin (0, 0). When the width a and the height b are even numbers, the center of the partial area $R_k$ does not correspond to the pixel (the center is disposed between the pixels), so that in order to make the origin (0, 0) correspond to the pixel, the origin (0, 0) is displaced from the center.

The partial area enumeration unit 151 includes a block enumeration unit 153, a partial area selecting unit 154, and a partial area selecting unit 155. The block enumeration unit 153 enumerates t blocks $B_1, \ldots B_t$. The partial area selecting unit 154 selects, from the original image, m candidates for partial areas $D_1, \ldots D_m$, within the blocks $B_1, \ldots B_t$, including a certain number or more of pixels whose pixel values are largely different from a representative pixel value. The partial area selecting unit 155 further selects n partial areas $R_1, \ldots R_n$ from the candidates for partial areas $D_1, \ldots D_m$.

Figure 10:
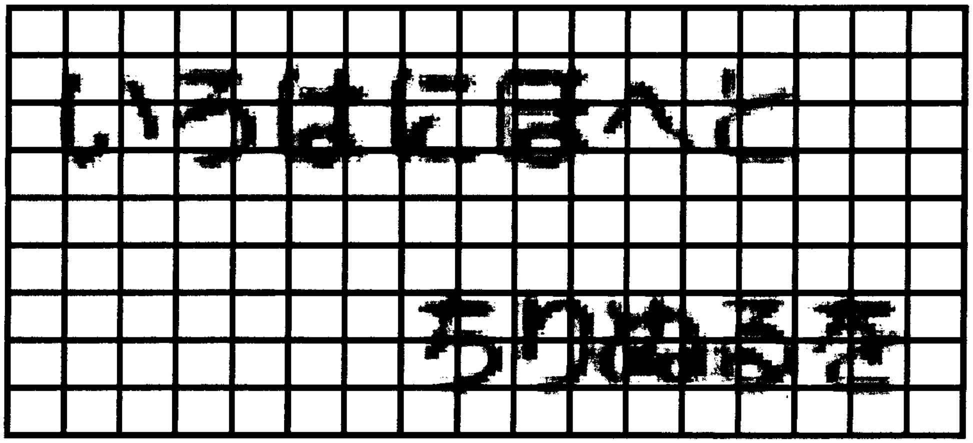
FIG. 10 is a diagram showing an example of candidates for partial areas enumerated by a block enumeration unit 153.

The block enumeration unit 153 enumerates t blocks $B_1, \ldots B_t$ from the image. FIG. 10 shows an example of candidates for partial areas enumerated by the block enumeration unit 153.

In the block enumeration unit 153, the number t of the blocks $B_1, \ldots B_t$ each having a width of a and a height of b and coordinates $(x_{B,1}, y_{B,1}), \ldots (x_{B,t}, y_{B,t})$ at the upper-left corners of the blocks are calculated in accordance with the following method.

A. $t_{horz}$ and $t_{vert}$ are calculated through the following expressions.

$$t_{horz} = \text{Floor}(w/a)$$

$$t_{vert} = \text{Floor}(h/b)$$

$$t = t_{horz} \cdot t_{vert}$$

Specifically, the original image (width: w, height: h) is basically divided into the blocks $B_1, \ldots B_t$ arranged as $t_{horz}$ blocks horizontal by $t_{vert}$ blocks vertical. Floor is used, when (w/a) and (h/b) cannot be divided, to round down a value below decimal point to the integer.

B. k is initialized to 1.

C. Coordinates $(x_{B,k}, y_{B,k})$ at the upper-left corner of the block $B_k$ are calculated as follows.

(1) The following processing is repeated while changing a value of $i_{vert}$ from 0 to $(t_{vert}-1)$.

(2) The following processing is repeated while changing a value of $i_{horz}$ from 0 to $(t_{horz}-1)$.

1) $x_{B,k}$ is calculated: $x_{B,k} = a \cdot i_{horz}$.

2) $y_{B,k}$ is calculated: $y_{B,k} = b \cdot i_{vert}$.

3) k is increased by 1.

By changing $i_{vert}$ and $i_{horz}$, k is changed between 1 to t. As a result of this, coordinates $(x_{B,1}, y_{B,1}), \ldots (x_{B,t}, y_{B,t})$ at the upper-left corners of all the blocks $B_1, \ldots B_t$ are calculated.

The partial area selecting unit 154 selects the number m of partial areas $D_1, \ldots D_m$ each having a width of a and a height of b and coordinates $(x_{D,1}, y_{D,1}), \ldots (x_{D,m}, y_{D,m})$ at the upper-left corners of the areas in accordance with the following method.

A. It is set that m=0.

B. The following processing is repeated while changing a value of k from 1 to t.

(1) A mean value of the pixel values I (x, y) of the original image in the block $B_k$ is calculated and is set as a representative pixel value $G_k$ of the original image. The mean value is a value of data located at a center when the pieces of data are arranged in order. When the number nn of data is an odd number, a value of the [(nn+1)/2]th smallest (substantially the central) data is the mean value. Furthermore, when the number nn of data is an even number, an average of the Floor [nn/2]th smallest (central) data and the Floor [(nn/2)+1]th smallest (central) data is the mean value. The mean value can be regarded as the representative pixel value in the block $B_k$.

(2) Threshold values $\theta_{1,k}$ and $\theta_{2,k}$ are calculated in accordance with the following expressions.

$$\theta_{1,k} = \alpha_1 \cdot G_k$$

$$\theta_{2,k} = \alpha_2 \cdot G_k$$

Note that $\alpha_1$ and $\alpha_2$ are predetermined constants which satisfy $0 < \alpha_1 < 1 < \alpha_2$.

(3) The number $e_k$ of pixels having pixel values which are out of the range of the pixel values determined based on the representative pixel value being the pixel value I (x, y) of the original image in the block $B_k$ satisfying the following condition, is counted.

$$I(x,y) \le \theta_{1,k}, \text{ or } \theta_{2,k} \le I(x,y)$$

(4) When $e_k \ge \beta \cdot a \cdot b$ is satisfied, the following processing is conducted. Note that β is a predetermined constant which satisfies $0 < \beta < 1$.

1) m is increased by 1.

2) It is set that $x_{D,m}=x_{B,k}$, $y_{D,m}=y_{B,k}$

Figure 11:
FIG. 11 is a diagram showing an example of candidates for areas selected by a partial area selecting unit 154.

Through the above processing, the partial area selecting unit 154 selects, from the original image, the candidates for partial areas $D_1, \ldots D_m$, within the blocks $B_1, \ldots B_t$, including a certain number or more of pixels whose pixel values are largely different from the representative pixel value. Specifically, the partial area selecting unit 154 selects a candidate for partial area $D_k$ having the number $e_k$ of pixels whose pixel values are out of the range of the threshold values $\theta_{1,k}$ to $\theta_{2,k}$ greater than a predetermined ratio β. FIG. 11 shows an example of candidates for areas selected by the partial area selecting unit 154.

The partial area selecting unit 155 selects the n partial areas $R_1, \ldots R_n$ each having a width of a and a height of b from the candidates for partial areas $D_1, \ldots D_m$, and coordinates $(x_1, y_1), \ldots (x_n, y_n)$ at the upper-left corners of the areas. The selection can be performed randomly. In this case, the partial areas $R_1, \ldots R_n$ can be selected by using a pseudo-random number k1 represented by the following expression (11). A candidate for partial area $D_{k1}$ is selected as the partial area $R_k$.

$$k1=\{[N(k-1)] \bmod m\}+1 \qquad \text{expression (11)}$$

Note that n is a predetermined number. Furthermore, N is a prime number and can be set as N=9973, for instance. "x mod y" indicates a remainder as a result of dividing x by y.

It is also possible to regularly select the partial areas $R_1, \ldots R_n$ from the candidates for partial areas $D_1, \ldots D_m$. For instance, it is possible to select the partial areas $R_1, \ldots R_n$ by using an integer k1 represented by the following expression (11a). A candidate for partial area $D_{k1}$ is selected as the partial area $R_k$.

$$k1=\mathrm{Floor}[(m-1)(k-1)/(n-1)]+1 \qquad \text{expression (11a)}$$

Coordinates $(x_k, y_k)$ at the upper-left corner of the selected partial area $D_k$ is represented as follows.

$$(x_k, y_k)=(x_{D,k1}, y_{D,k1})$$

The selection by the partial area selecting unit 155 is conducted for aligning the number n of the partial areas $R_1, \ldots R_n$. The number m of the candidates for partial areas $D_1, \ldots D_m$ selected by the partial area selecting unit 154 depends on the original image. Specifically, the number depends on a ratio of areas, included in the original image, including a certain number or more of pixels whose pixel values are largely different from the representative pixel value. It is also possible to align the number n of the partial areas $R_1, \ldots R_n$ by interrupting the selection by the partial area selecting unit 154 in the middle thereof. In the present embodiment, after the selection by the partial area selecting unit 154 is completed, the number n of the partial areas $R_1, \ldots R_n$ is adjusted by the partial area selecting unit 155.

As described above, various methods, which can be performed randomly or regularly, can be adopted for the selection of the partial areas $R_1, \ldots R_n$ by the partial area selecting unit 155. As the entire partial area enumeration unit 151, various methods can be adopted for enumerating, from the original image, the partial areas $R_1, \ldots R_n$ including a certain number or more of pixels whose pixel values are largely different from the representative pixel value.

The calculating unit of autocorrelation in area 152 calculates, for each of the partial areas $R_k$, the autocorrelation coefficient $C_k$ (p, q) of the pixel value E (x, y) of the edge image. The calculating unit of autocorrelation in area 152 includes an extracted image extracting unit 156, and a calculating unit of autocorrelation of extracted image 157.

The extracted image extracting unit 156 extracts, from the edge image, partial edge images $U_1, \ldots U_n$ corresponding to the respective partial areas $R_1, \ldots R_n$. The calculating unit of autocorrelation in area 152 calculates an autocorrelation coefficient corresponding to each of the extracted images. As described above, the partial area $R_k$ is the area having a width of a and a height of b and coordinates at the upper-left corner of $(x_k, y_k)$. The extracted image extracting unit 156 substitutes a pixel value E $(x_k+x, y_k+y)$ of the edge image by setting it as a pixel value $F_k$ (x, y) located x pixels to the right and y pixels down from the upper-left corner of the extracted image, as shown by the following expression.

$$F_k(x,y)=E(x_k+x, y_k+y)$$

Figure 13A:
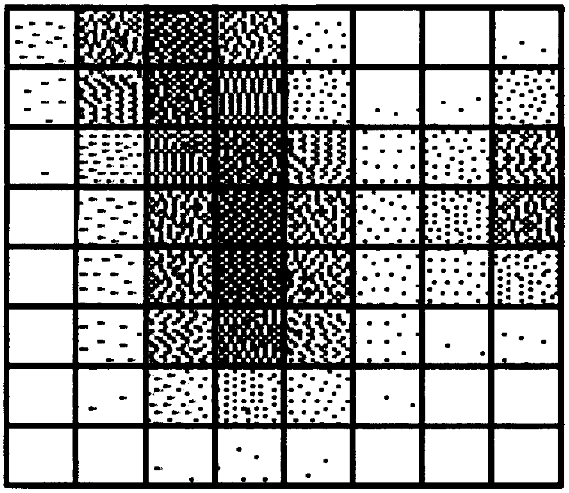
FIG. 13A is a diagram showing an example of gradation pattern representing the original image of the partial area.
Figure 13B:
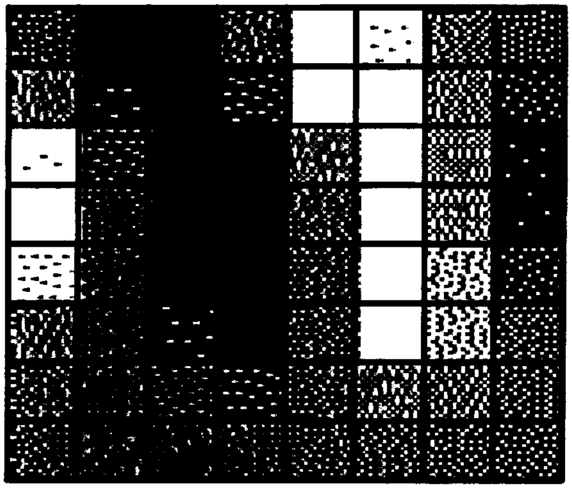
FIG. 13B is a diagram showing an example of gradation pattern representing the real components of the edge image.
Figure 13C:
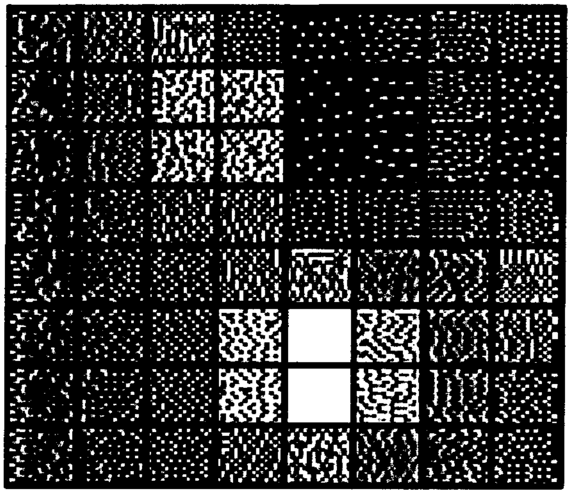
FIG. 13C is a diagram showing an example of gradation pattern representing the imaginary components of the edge image.
Figure 14A:
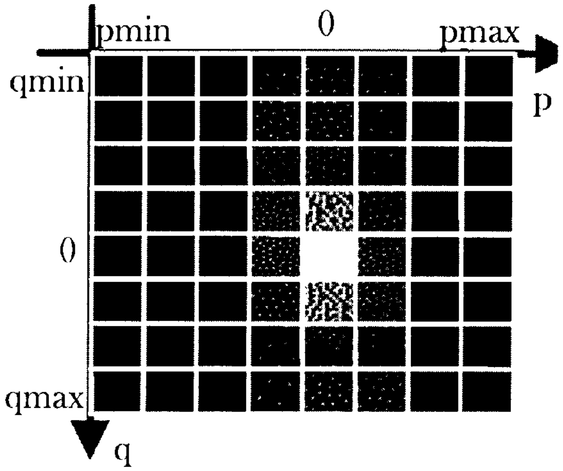
FIG. 14A is a diagram showing an example of gradation pattern of autocorrelation coefficients.
Figure 14B:
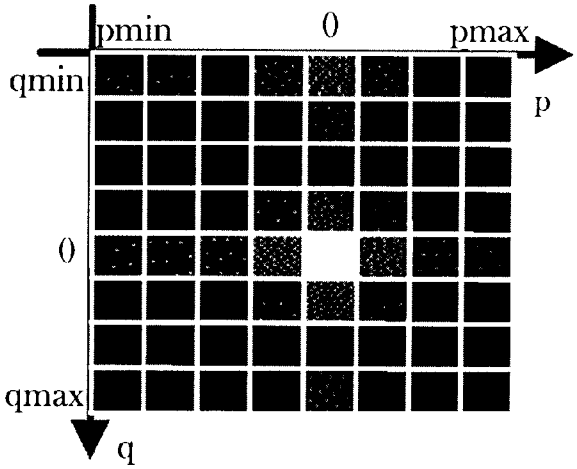
FIG. 14B is a diagram showing an example of gradation pattern of the autocorrelation coefficients.
Figure 14C:
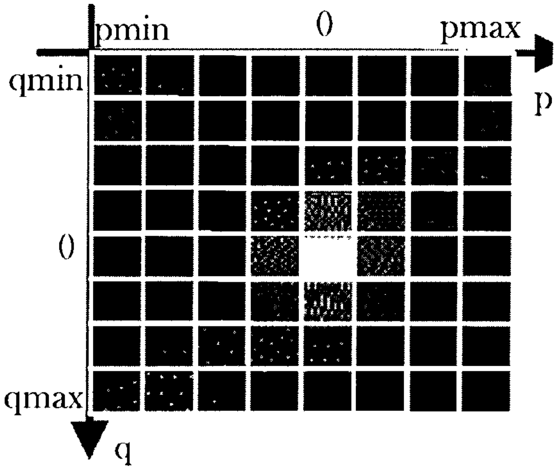
FIG. 14C is a diagram showing an example of gradation pattern of the autocorrelation coefficients.
Figure 14D:
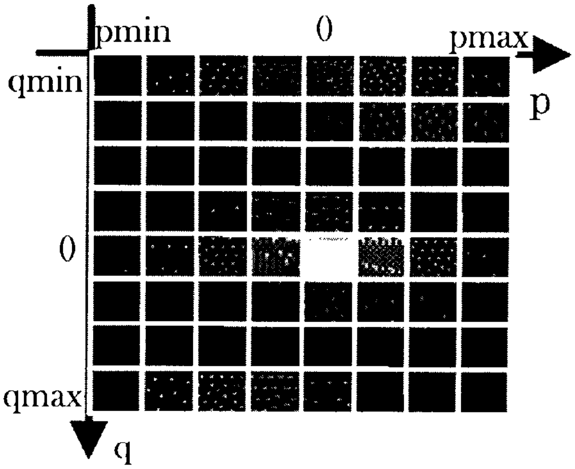
FIG. 14D is a diagram showing an example of gradation pattern of the autocorrelation coefficients.

FIG. 12A to FIG. 12C show an example of two-dimensional vectors representing an original image of a partial area, real components, and imaginary components of an edge image generated from the original image, respectively. FIG. 13A to FIG. 13C show an example of gradation pattern representing the original image of the partial area, the real components, and the imaginary components of the edge image generated from the original image, respectively. In the original image, the pixel value 0 is indicated by black, and the pixel value 255 is indicated by white. In the edge image, a pixel in which respective components of the extracted image are close to zero is indicated by a gray color, a pixel in which the magnitudes of the respective components are large is indicated by a brighter color, and a pixel in which the magnitudes of the respective components are small is indicated by a darker color.

The calculating unit of autocorrelation of extracted image 157 calculates a second-order or higher of an autocorrelation coefficient $C_k$ (p, q) of the extracted image. The calculating unit of autocorrelation of extracted image 157 works as an autocorrelation calculating section that calculates the autocorrelation coefficient for each of the partial areas $R_1, \ldots R_n$. The calculating unit of autocorrelation of extracted image 157 calculates the autocorrelation coefficient $C_k$ (p, q) for each of the integers p and q satisfying $p_{min}<p<p_{max}$, $q_{min}<q<q_{max}$, through the following expression (21), for instance.

$$C_k(p,q)=\eta\cdot\Sigma_{y=0}^{b}\Sigma_{x=0}^{a}F_k(x,y)\cdot CJ(F_k((p+x) \bmod a,(q+y) \bmod b))/\Sigma_{y=0}^{b}\Sigma_{x=0}^{a}F_k(x,y)\cdot CJ(F_k(x,y)) \qquad \text{expression (21)}$$

Here, η is a predetermined constant (255, for instance). Furthermore, CJ (x) represents a conjugate complex number of x.

The expression (21) is basically represented by the following expression (22).

$$C_k(p,q)=\eta\cdot\Sigma_{y=0}^{b}\Sigma_{x=0}^{a}F_k(x,y)\cdot CJ(F_k(p+x,q+y)/\Sigma_{y=0}^{b}\Sigma_{x=0}^{a}F_k(x,y)\cdot CJ(F_k(x,y)) \qquad \text{expression (22)}$$

The reason why "(p+x) mod a" and "(q+y) mod b" are set in the expression (21) is to easily perform the calculation of the autocorrelation coefficient $C_k$ (p, q) by defining E (x, y) on the outside of the area of the original extracted image. Specifically, the autocorrelation coefficient $C_k$ (p, q) is calculated by assuming that the extracted images are arranged vertically and horizontally.

FIG. 14A to FIG. 14D show an example of gradation pattern of autocorrelation coefficients calculated by the calculating unit of autocorrelation of extracted image 157 (FIG. 14A to FIG. 14D correspond to the partial areas $R_1$ to $R_4$, respectively). FIG. 15A to FIG. 15D show an example of two-dimensional array representing the autocorrelation coefficients (FIG. 15A to FIG. 15D correspond to the partial areas $R_1$ to $R_4$, respectively). In the gradation pattern of the autocorrelation coefficients, a value equal to or less than 0 is indicated by black, and a value greater than 0 is indicated by the brightness in accordance with the magnitude of the value.

The expressions (21) and (22) take into consideration that the pixel value $F_k$ (x, y) of the extracted image is the complex number. If the pixel value $F_k$ (x, y) is a real number (for instance, if the pixel value E (x, y) of the edge image can be represented by the expressions (4a) to (4c)), an arithmetic expression of the autocorrelation coefficient $C_k$ (p, q) is simplified. For instance, the expression (22) is represented as the following expression (23).

$$C_k(p,q)=\eta\cdot\Sigma_{y=0}^{b}\Sigma_{x=0}^{a}F_k(x,y)\cdot F_k(p+x,q+y)/\Sigma_{y=0}^{b}\Sigma_{x=0}^{a}F_k(x,y)\cdot F_k(x,y) \quad \text{expression (23)}$$

As the calculation method of autocorrelation coefficient in the calculating unit of autocorrelation of extracted image 157, not only the aforementioned method but also various methods can be adopted as long as the autocorrelation coefficient $C_k$ (p, q) of the edge image in the partial area can be calculated. For example, the autocorrelation coefficient $C_k$ (p, q) can be calculated by Fourier-transforming the pixel value $F_k$ (p, q) to calculate a spectrum of the pixel value $F_k$ (p, q) (to resolve a spatial frequency) and then inverse-Fourier-transforming a square of an absolute value of the spectrum.

The degradation function estimating unit 124 estimates a degradation function T (p, q) by calculating the representative coefficient value for each of the coordinates (p, q) of the autocorrelation coefficients $C_k$ (p, q) (for each of the pixels). The degradation function estimating unit 124 works as a representative coefficient value calculating section that creates the representative coefficient value of the plurality of autocorrelation coefficients in each of the plurality of corresponding pixels. The degradation function T (p, q) is a function representing the degree of degradation of the image caused by an imaging system used for capturing the original image. The degradation function estimating unit 124 calculates the degradation function T (p, q) in the coordinates (p, q) in accordance with the following expression.

$$T(p,q)=\min(C_1(p,q), \ldots C_n(p,q))$$

Figures 16A, 16B:
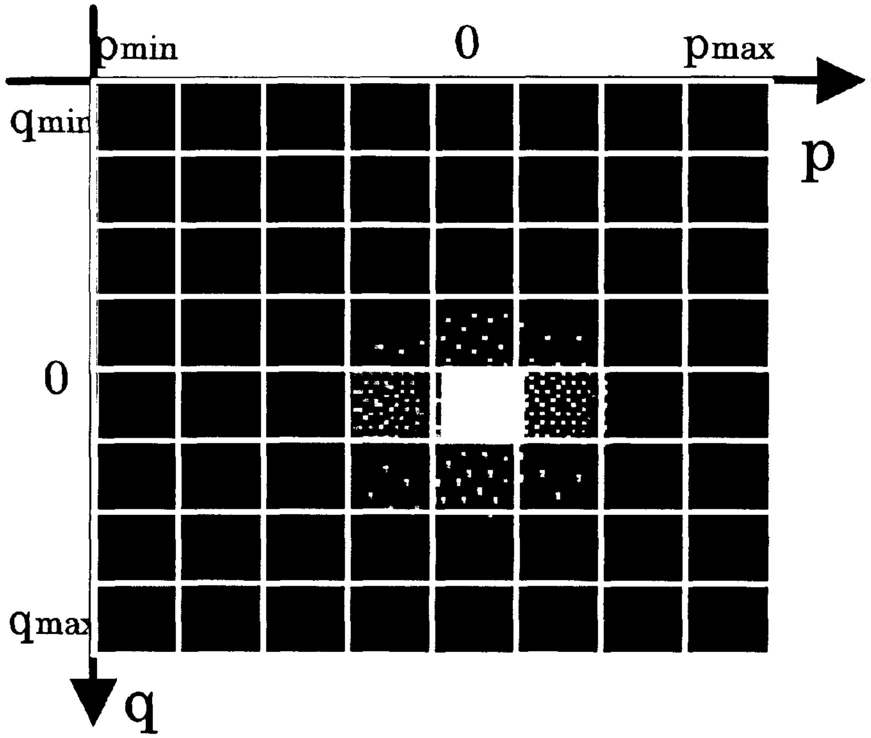
FIG. 16A is a diagram showing a gradation pattern of degradation function T (p, q) calculated from the autocorrelation coefficients.
FIG. 16B is a diagram showing a two-dimensional array representing the degradation function T (p, q) calculated from the autocorrelation coefficients.

Note that min ($x_1, \ldots x_n$) indicates the minimum value of $x_1, \ldots x_n$. FIG. 16A and FIG. 16B show a gradation pattern and a two-dimensional array of degradation function T (p, q) calculated from the autocorrelation coefficients shown in FIGS. 14A to 14D and FIGS. 15A to 15D.

The autocorrelation coefficients $C_k$ (p, q) have a distribution corresponding to the degree of correlation of the pixel values $F_k$ (p, q). In the origin (0, 0), the correlation between the same pixels is calculated, and it takes the maximum value ($\eta$). A point other than the origin takes a value corresponding to the correlation of offsets p and q in the horizontal direction and the vertical direction. For example, if the edge (boundary of bright and dark) is clear in the original image, large pixel values $F_k$ (p, q) are aligned linearly along the edge direction. Furthermore, if the edge (boundary of bright and dark) is not clear in the original image, relatively large pixel values $F_k$ (p, q) are aligned with width along the edge direction.

Specifically, it is possible to determine the quality of the original image based on the width of the autocorrelation coefficients $C_k$ (p, q). Generally, the determination of the edge direction is required to obtain the width. Since no determination of the edge direction is required in this embodiment, the degradation function T (p, q) is calculated by calculating a plurality of autocorrelation coefficients $C_k$ (p, q) from the original image and obtaining the representative coefficient value of the plurality of autocorrelation coefficients $C_k$ (p, q) for each of the coordinates (p, q). As above, by obtaining the representative coefficient values of the autocorrelation coefficients $C_k$ (p, q), it becomes possible to alleviate the influence corresponding to the edge direction (to eliminate the autocorrelation depending on the geometrical structure of the image), and thus to eliminate the necessity of determining the edge direction.

The reason why the component corresponding to the geometrical structure of the image can be eliminated by setting the minimum value of the autocorrelation coefficients $C_k$ (p, q) for each of the coordinates (p, q) to the degradation function T (p, q) is because the autocorrelation coefficient $C_k$ (p, q) can be decomposed into the component corresponding to the image degradation and the sum of components that depend on the geometrical structure, in which if the components that depend on the geometrical structure are assumed to be positive, by calculating the minimum value for each of the coordinates of the autocorrelation calculated for each of the partial areas of the edge image, the components that depend on the structure can be eliminated.

It is also possible to calculate the degradation function T (p, q) through the following expression.

$$T(p,q)=\max(0,\min(C_1(p,q), \ldots C_n(p,q)))$$

This expression prevents the value of the degradation function T (p, q) from being less than 0.

The degradation function T (p, q) can also be calculated as an order statistic represented by the following expression.

$$T(p,q)=\mathrm{odr}(C_1(p,q), \ldots C_n(p,q);r)$$

$$r=\mathrm{Floor}(\gamma\cdot(n-1))+1$$

Note that odr ($x_1, \ldots x_n$; r) indicates the 'r' th smallest value in $x_1, \ldots x_n$, and $\gamma$ indicates a predetermined real constant which is not less than 0 nor more than 1. For instance, if it is set that $\gamma$=0.05, the degradation function T (p, q) can be defined by setting the numberth autocorrelation coefficient $C_k$ (p, q) counted from the minimum value as the representative coefficient value, the number corresponding to 5% of the total number of values. Floor (x) is set to indicate the maximum value of integers equal to or less than x.

The degradation function estimating unit 124 can also calculate the degradation function T (p, q) by selecting a larger value between the order statistic odr ($C_1$ (p, q), . . . (p, q); r) of autocorrelation coefficient and 0, as represented by the following expression. When the order statistic odr ($C_1$ (p, q), . . . $C_n$ (p, q); r) is less than 0, it is replaced with 0.

$$T(p,q)=\max(0,\mathrm{odr}(C_1(p,q), \ldots C_n(p,q);r))$$

$$r=\mathrm{Floor}(\gamma\cdot(n-1))+1$$

As described above, by using the representative coefficient value of the autocorrelation coefficients $C_1$ (p, q), . . . $C_n$ (p, q), the degradation function T (p, q) from which the autocorrelation depending on the geometrical structure (for instance, the arrangement of the edge) is eliminated, is calculated. Accordingly, the degradation function T (p, q) results in including a lot of components of autocorrelation corresponding to the image degradation, which enables to easily calculate the degree of image degradation from the degradation function T (p, q).

For the calculation of the degradation function T (p, q) from the autocorrelation coefficients $C_1$ (p, q), . . . $C_n$ (p, q), not only the example cited here but also any method can be adopted as long as the autocorrelation corresponding to the image degradation can be computed by eliminating the autocorrelation depending on the geometrical structure.

Figure 17:
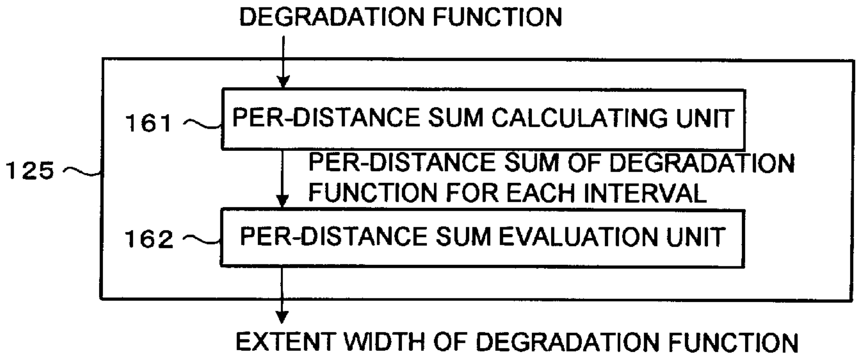
FIG. 17 is a block diagram showing an example of a structure of the extent width calculating unit 125.

The extent width calculating unit 125 calculates a extent width of the degradation function T (p, q). The extent width calculating unit 125 works as an extent width calculating section that calculates an extent width of the distribution of the representative coefficient values. FIG. 17 is a block diagram showing an example of a structure of the extent width calculating unit 125. The extent width calculating unit 125 includes a per-distance sum calculating unit 161, and a per-distance sum evaluation unit 162.

The per-distance sum calculation unit 161 calculates per-distance sums of the degradation function for each interval of distance ν from the origin (0, 0). The interval is set as [0, 1), [1, 2), . . . [ν, ν+1), [$\nu_{max}$, $\nu_{max}$+1). Here, it is set that [x, y) indicates an interval of real value which is not less than x and less than y, ν indicates an integer, and $\nu_{max}$ is defined by the following expression.

$$\nu_{max}=\mathrm{Ceil}((\max(-p_{min},p_{max})^2+\max(-q_{min},q_{max})^2)^{1/2})-1$$

Note that Ceil (x) is set to indicate the minimum value of integers equal to or more than x.

The per-distance sum of the degradation function at an interval of distance [ν, ν+1) is represented as S(ν).

$\nu_{max}$ indicates the maximum distance from the origin (0, 0) to the periphery of the extracted image, and is basically represented by the following expression.

$$\nu_{max}=(P_{max}^2+q_{max}^2)^{1/2}-1$$

The expression is complicated since it is dealt with a case where the absolute value of "$P_{min}$" is greater than "$P_{max}$", and $\nu_{max}$ is set as an integer.

The per-distance sum calculation unit 161 calculates the per-distance sum S(ν) of the degradation function in accordance with the following method.

A. It is set that S(ν)=0 for each integer ν satisfying $0 \le \nu \le \nu_{max}$.

B. The following processing is repeated for each integer q satisfying $q_{min} \le q \le q_{max}$.

(1) The following processing is repeated for each integer p satisfying $p_{min} \le p \le p_{max}$.

1) ν is calculated: ν=Floor $((p^2+q^2)^{1/2})$.

2) T (p, q) is added to S(ν).

Figure 18:
FIG. 18 is a diagram showing an example of per-distance sum S(v) of a degradation function calculated by the per-distance sum calculating unit 161.

FIG. 18 shows an example of the per-distance sum S(ν) of the degradation function calculated by the per-distance sum calculation unit 161. When the distance ν is from 0 to 2, the per-distance sum S(ν) takes a value of 255, 480, and 0. When the distance ν is equal to or more than 2, the per-distance sum S(ν) is 0.

The per-distance sum evaluation unit 162 calculates a extent width λ of the degradation function based on the per-distance sum of the degradation function. The per-distance sum evaluation unit 162 calculates the extent width λ in accordance with the following method.

A. It is set that S=0.

B. It is set that $\lambda=\nu_{max}$.

C. The following processing is repeated until it is satisfied that λ=0 or S≥θ.

(1) S(λ) is added to S: S=S+S(λ)

This is the same as obtaining the area of function of the per-distance sum S(ν) of the degradation function.

(2) 1 is subtracted from λ.

Note that θ is a predetermined real constant value.

In the extent width calculating unit 125, a extent width S of the degradation function can also be calculated in accordance with the following expression.

$$S=\{\Sigma_{q=qmin}^{qmax}\Sigma_{p=pmin}^{pmax}T(p,q)\cdot(p^2+q^2)/\Sigma_{q=qmin}^{qmax}\Sigma_{p=pmin}^{pmax}T(p,q)\}^{1/2}$$

As a calculation method of the extent width of the degradation function in the extent width calculating unit 125, not only the aforementioned method but also any method can be adopted as long as a value that reflects a magnitude of the extent of the degradation function can be calculated with the method.

The quality checking unit 126 determines the quality of the original image by comparing the extent width λ with a predetermined threshold value Λ. The quality checking unit 126 works as a checking section that determines the quality of the image based on the distribution of the representative coefficient values. The quality checking unit 126 determines that the original image is non-defective when the extent width λ is equal to or less than the threshold value Λ, and it determines that the original image is defective when the extent width λ is greater than the threshold value Λ.

In the present embodiment, the degradation function T (p, q) is calculated in the degradation function estimating unit 124, and the extent width of the degradation function is calculated in the extent width calculating unit 125 for all of the coordinates (p, q) in a range of $p_{min} \le p \le p_{max}$, $q_{min} \le q \le q_{max}$. However, there is no problem if the degradation function T (p, q) is calculated for only a part of the coordinates (p, q) in the range, and the extent width is calculated based on the function.

As described above, in the present embodiment, the degradation function T (p, q) that reflects the image degradation corresponding to the defect caused by blurring, camera-shake and the like is estimated, and the extent width of the degradation function T (p, q) is used for the determination of presence/absence of the defect. In the present embodiment, advantages as described below can be attained.

(1) The extent width of the degradation function T (p, q) is not influenced by a contrast of the image, so that even when the contrast of the image is varied, it is possible to accurately evaluate the image quality.

(2) The estimation of the edge direction is not required, so that there arises no problem caused by an error in the estimation of the edge direction.

Figure 19:
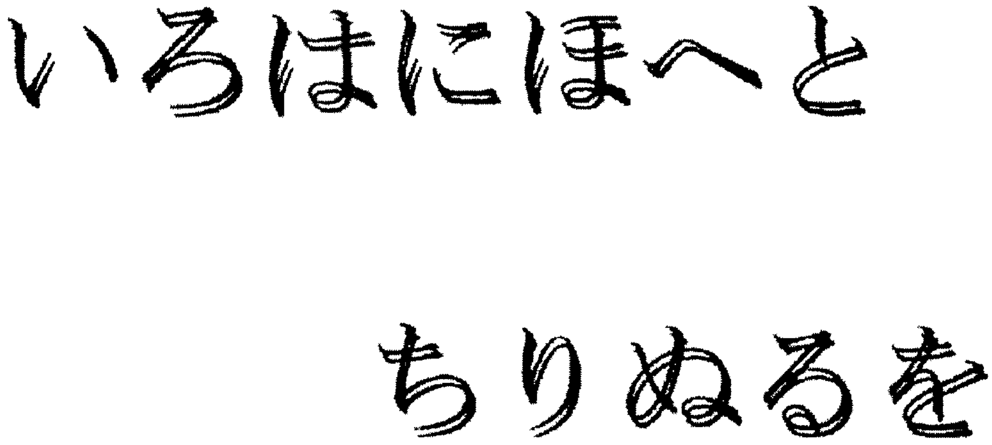
FIG. 19 is a diagram showing an example of a gray-scale image.
Figure 20:
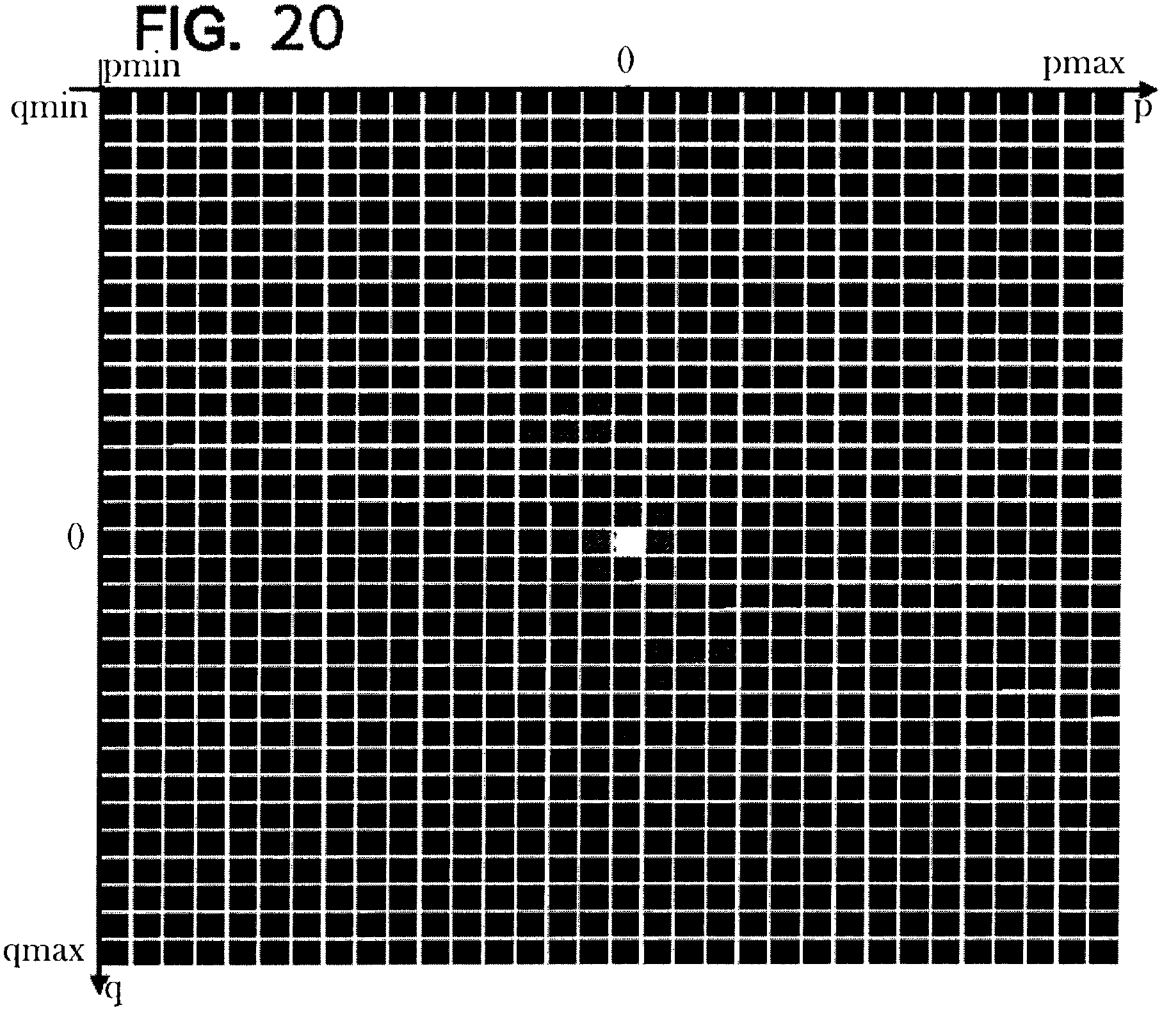
FIG. 20 is a diagram showing an example of a degradation function.

(3) Even when the ghost images are present, it is possible to detect the extent of the degradation function caused by the ghost images as the defect of the image quality. For instance, double image occurs in an image shown in FIG. 19, and from this image, a degradation function as shown in FIG. 20 is calculated. In this example, a peak of the degradation function can be observed not only in the vicinity of the origin but also on the lower right and upper left, so that it is possible to detect an abnormality of the image as the extent of the degradation function.

(4) The magnitude of spatial frequency is not used for the evaluation of sharpness, so that even when there is a problem in a quantization method of pixel values or even when there is generated a noise including a high frequency component at the time of capturing an image, there is no chance of overestimating the sharpness based on an image in which blurring or the like occurs.

OTHER EMBODIMENTS

Embodiments of the present invention are not limited to the above embodiment and can be expanded or modified, and the expanded or modified embodiment is also included in the technical scope of the present invention.

What is claimed is:

1. An image evaluation device, comprising:

a partial area extracting section that extracts a plurality of partial areas from an image;

an extracted image generating section that extracts plural extracted images corresponding to plural partial areas from the image;

an autocorrelation calculating section that calculates autocorrelation coefficients in two dimensional displacement for each extracted image;

a degradation function estimating section that calculates a value of a degradation function for each two dimensional displacement, by calculating a representative value of the autocorrelation coefficients at the corresponding two dimensional displacement among the partial areas, the degradation function representing a degree of degradation of the image from the autocorrelation coefficients for each two dimensional displacement; and a checking section that checks the quality of the image based on the degradation function.

2. The image evaluation device according to claim 1, wherein the degradation function estimating section calculates the degradation function by calculating an extent width of the distribution of the representative coefficient values.

3. The image evaluation device according to claim 2, wherein the degradation function estimating section calculates the degradation function by comparing the extent width with a predetermined threshold value.

4. The image evaluation device according to claim 1, wherein the representative coefficient value of the plurality of autocorrelation coefficients is the minimum value of the plurality of autocorrelation coefficients or a value of autocorrelation coefficients in predetermined order from the minimum value.

5. The image evaluation device according to claim 4, wherein the representative coefficient value of the plurality of autocorrelation coefficients is replaced with a value equal to or greater than 0 if the value is less than 0.

6. The image evaluation device according to claim 1, wherein the extracted images are extracted by extracting an edge image for each partial area.

7. The image evaluation device according to claim 6, wherein pixel value of each pixel in the edge image represents the gradient of pixel value in a predetermined direction or a pair of directions on the pixel.

8. The image evaluation device according to claim 1, wherein the extracted image generating section comprises, an image generating section that generates an image having pixels whose pixel values correspond to the gradient of pixel values in the original image; and wherein an extracted image extracting section extracts extracted images for each of the partial areas, from the generated image.

9. The image evaluation device according to claim 1, wherein the partial area extracting section comprises, a dividing section that divides the image into plural partial areas;

wherein a first decision section computes a representative pixel value for each of the divided partial areas;

wherein a second decision section computes a range of pixel values based on the computed representative pixel value; and wherein an extracting section extracts a partial area having a predetermined number or more of pixels whose pixel values are outside of the computed range of the pixel values, from the divided partial areas.

10. The image evaluation device according to claim 1, further comprising, a gray-scale section gray-scaling an image, wherein the extracted image generating section generates an extracted image from the gray-scale image.

11. An image evaluation method, comprising:

extracting plural partial areas from an image;

generating plural extracted images corresponding to the plural partial areas;

calculating plural autocorrelation coefficients in two dimensional displacement for each extracted image;

calculating a value of a degradation function for each two dimensional displacement, by calculating a representative value of the autocorrelation coefficients at the corresponding two dimensional displacement among the partial areas, the degradation function representing a degree of degradation of the image from the autocorrelation coefficients for each two dimensional displacement; and checking the quality of the image based on the degradation function.

12. The image evaluation method according to claim 11, wherein the degradation function is calculated by calculating an extent width of the distribution of the representative coefficient values.

13. The image evaluation method according to claim 12, wherein the degradation function is calculated by comparing the extent width with a predetermined threshold value.

14. The image evaluation method according to claim 11, wherein the representative coefficient value of the autocorrelation coefficients is the minimum value of the autocorrelation coefficients or a value of autocorrelation coefficient in predetermined order from the minimum value.

15. The image evaluation method according to claim 14, wherein the representative coefficient value of the plural autocorrelation coefficients is replaced with a value equal to or greater than 0 when the value is less than 0.

16. The image evaluation method according to claim 11, wherein the extracted image is extracted by extracting an edge image in a partial area.

17. The image evaluation method according to claim 16, wherein the pixel value for each pixel in the edge image represents a gradient of pixel value in a predetermined direction or a pair of directions at the position.

18. The image evaluation method according to claim 11, wherein the step of generating the extracted images comprises:

generating an image having pixels whose pixel values correspond to the gradient of pixel values in the original image; and extracting extracted images from each of the partial areas in the generated image.

19. The image evaluation method according to claim 11, wherein the step of generating the extracted images comprises:

dividing the image into a plurality of partial areas;

computing a representative pixel value for each of the plurality of divided partial areas;

computing a range of pixel values based on the computed representative pixel value; and extracting, from the divided partial areas, a partial area having a predetermined number or more of pixels whose pixel values are outside of the computed range of the pixel values.

20. The image evaluation method according to claim 11, further comprising, gray-scaling an image, wherein in the step of generating the extracted images, an extracted image is generated from the gray-scale image.

* * * * *